(12) United States Patent
Kim et al.

(10) Patent No.: US 11,217,864 B2
(45) Date of Patent: Jan. 4, 2022

(54) BATTERY MODULE HAVING ENHANCED ELECTRICAL CONNECTION STABILITY

(71) Applicant: LG Chem, Ltd., Seoul (KR)

(72) Inventors: Kyung-Mo Kim, Daejeon (KR); Jeong-O Mun, Daejeon (KR); Ho-June Chi, Daejeon (KR); Hang-June Choi, Daejeon (KR)

(73) Assignee: LG Chem, Ltd.

( * ) Notice: Subject to any disclaimer, the term of this patent is extended or adjusted under 35 U.S.C. 154(b) by 99 days.

(21) Appl. No.: 16/609,981

(22) PCT Filed: Oct. 31, 2018

(86) PCT No.: PCT/KR2018/013133
§ 371 (c)(1),
(2) Date: Oct. 31, 2019

(87) PCT Pub. No.: WO2019/103344
PCT Pub. Date: May 31, 2019

(65) Prior Publication Data
US 2020/0067066 A1 Feb. 27, 2020

(30) Foreign Application Priority Data
Nov. 24, 2017 (KR) .................. 10-2017-0158519

(51) Int. Cl.
*H01M 50/54* (2021.01)
*H01M 50/172* (2021.01)
*H01M 50/557* (2021.01)

(52) U.S. Cl.
CPC ......... *H01M 50/54* (2021.01); *H01M 50/172* (2021.01); *H01M 50/557* (2021.01)

(58) Field of Classification Search
CPC .. H01M 50/54; H01M 50/172; H01M 50/557; H01M 50/502
See application file for complete search history.

(56) References Cited

U.S. PATENT DOCUMENTS

2003/0215702 A1 11/2003 Tanjou et al.
2003/0224246 A1 12/2003 Watanabe et al.
(Continued)

FOREIGN PATENT DOCUMENTS

CN 102195026 A 9/2011
CN 102820448 A 12/2012
(Continued)

OTHER PUBLICATIONS

Extended European Search Report including Written Opinion for Application No. EP18881818.1, dated Jul. 9, 2020, pp. 1-8.
(Continued)

*Primary Examiner* — Maria Laios
*Assistant Examiner* — Adam J Francis
(74) *Attorney, Agent, or Firm* — Lerner, David, Littenberg, Krumholz & Mentlik, LLP

(57) ABSTRACT

A battery module is provided. The battery module includes pouch-type battery cells stacked on each other and electrically connected in series and/or in parallel. Toward an electrode lead of one pouch-type battery cell, electrode leads of other pouch-type battery cells are biased to allow ends of the electrode leads to be overlapped. In particular, each of the pouch-type battery cells has an R bending portion at which a boundary region between a terrace of a pouch case and the electrode leads is bent toward a direction in which the electrode leads are biased.

7 Claims, 9 Drawing Sheets

(56) References Cited

U.S. PATENT DOCUMENTS

| | | | |
|---|---|---|---|
| 2004/0175611 A1* | 9/2004 | Otohata | H01M 50/543 |
| | | | 429/127 |
| 2011/0223478 A1 | 9/2011 | Han | |
| 2012/0315531 A1* | 12/2012 | Lev | H01M 50/502 |
| | | | 429/159 |
| 2013/0149561 A1 | 6/2013 | Hong et al. | |
| 2015/0171401 A1 | 6/2015 | Kim et al. | |
| 2015/0303415 A1 | 10/2015 | Kayano et al. | |
| 2016/0226043 A1 | 8/2016 | Lee et al. | |
| 2017/0125774 A1 | 5/2017 | Choi et al. | |
| 2018/0269454 A1* | 9/2018 | De Souza | H01M 50/502 |

FOREIGN PATENT DOCUMENTS

| | | |
|---|---|---|
| CN | 106133948 A | 11/2016 |
| JP | 2000-021387 A | 1/2000 |
| JP | 2001-256960 A | 9/2001 |
| JP | 2002-510124 A | 4/2002 |
| JP | 2002-298825 A | 10/2002 |
| JP | 2003-323883 A | 11/2003 |
| JP | 2004-158434 A | 6/2004 |
| JP | 2007-095465 A | 4/2007 |
| JP | 2009-532843 A | 9/2009 |
| JP | 2014053104 A | 3/2014 |
| KR | 10-2004-0054128 A | 6/2004 |
| KR | 10-2004-0107040 A | 12/2004 |
| KR | 10-1038680 B1 | 6/2011 |
| KR | 10-2017-0011038 A | 2/2017 |

OTHER PUBLICATIONS

Chinese Search Report for Application No. 201880031997.3 dated Oct. 11, 2021, 3 Pages.

* cited by examiner

BATTERY MODULE HAVING ENHANCED ELECTRICAL CONNECTION STABILITY

CROSS-REFERENCES TO RELATED APPLICATIONS

This application is a U.S. national phase application, pursuant to 35 U.S.C. § 371, of PCT/KR2018/013133, filed Oct. 31, 2018, designating the United States, which claims priority to Korean Application No. 10-2017-0158519, filed Nov. 24, 2017. The entire contents of the aforementioned patent applications are incorporated herein by this reference.

TECHNICAL FIELD

The present disclosure relates to a battery module, and more particularly, to a battery module capable of preventing an electric contact between a pouch case and an electrode lead in pouch-type battery cells connected in parallel within the battery module and improving bonding stability between a bus bar and a plurality of electrode leads overlapped in multiple layers at a parallel connection structure.

BACKGROUND ART

Generally, lithium secondary batteries may be classified into a can-type secondary battery in which an electrode assembly is included in a metal can and a pouch-type secondary battery in which an electrode assembly is included in a pouch made of an aluminum sheet, depending on the exterior shape.

Recently, secondary batteries have been widely used not only in small-sized devices such as portable electronic devices, but also in electric vehicles that require an operating power using internal combustion engines and/or electric motors. The electric vehicles include hybrid electric vehicles, plug-in hybrid electric vehicles, and pure electric vehicles powered by an electric motor and a battery without an internal combustion engine.

In the electric vehicles, a large number of secondary batteries are electrically connected to increase capacity and power. In particular, pouch-type secondary batteries are widely used for the mid-to-large-sized devices since they are easily stacked. For example, typically, the battery modules of the mid-to-large-sized devices are implemented by stacking the pouch-type secondary batteries and connecting the electrode leads in series and/or in parallel.

Meanwhile, as shown in FIG. 1, when pouch-type battery cells 1, 2, and 3 are connected in parallel, electrode leads 1a, 2a, and 3a of the same polarity are overlapped, and end portions thereof are bent and contacted on a top surface of a bus bar 4. Subsequently, the end portions are welded together to be bonded in this state.

However, when the pouch-type battery cells are connected in parallel as above, as shown in FIG. 2, a positive electrode lead 1a of one pouch-type battery cell 1 frequently interferes with a terrace front end 2b of a pouch case of another pouch-type battery cell 2 adjacent thereto. The pouch case has a layered structure in which an outer insulation layer 7, an aluminum layer 6, and an inner adhesion layer 5 are laminated in order. The electrode lead is allowed to contact the outer insulation layer 7 of the pouch case, but an electric short may occur when the electrode contacts the terrace front end 2b at which the aluminum layer 6 may be exposed. In other words, when the positive electrode lead 1a contacts the aluminum layer 6 of the pouch case in a state where the insulation of the pouch case is broken, a short circuit may occur, which greatly increase the possibility of ignition.

In other words, the pouch-type secondary battery may be somewhat vulnerable to an external physical impact due to its configuration. Thus, unless thermal bonding is performed precisely during the sealing process, the vulnerability may become more serious so that a crack or a damage may occur in the inner adhesion layer 5 merely with a minor physical impact, thereby converting the aluminum layer 6 into an electrode. When the inner adhesion layer 5 is damaged, the aluminum layer 6 may be polarized since it is in direct contact with the electrode assembly. In general, since the negative electrode plate is disposed at an outermost side of the electrode assembly, the aluminum layer 6 becomes a negative electrode. In a state where the aluminum layer 6 becomes a negative electrode, when the positive electrode lead 1a contacts the terrace front end 2b of the pouch case as shown in FIG. 2, a short circuit may occur, which may lead to ignition of the pouch-type secondary battery.

Thus, especially when multiple pouch-type secondary batteries are connected in parallel, it is needed to provide an insulating means that isolates the electrode lead from the terrace front end of the pouch case. For example, in a conventional battery module process, an additional insulating sheet or insulation tape is applied between adjacent pouch-type battery cells, or an injection-molded component is additionally assembled. However, these solutions cause other problems such as an increased cost and a complicated assembly process.

In addition, in the conventional technique, a large number of manual operations are required to weld the electrode leads to the bus bar, and the electrode leads and the bus bar are not easily adhered to each other due to the elastic restoration force of the electrode leads made of a metallic material. In particular, when three or more electrode leads are connected in parallel, a plurality of electrode leads should be overlapped on the bus bar, which makes the welding work more difficult and deteriorates the welding quality.

DISCLOSURE

Technical Problem

The present disclosure is directed to providing a battery module, which may prevent an electric contact between an electrode lead and a terrace front end of a pouch case in adjacent pouch-type battery cells among a plurality of pouch-type battery cells connected in parallel and may also improve bonding stability between a plurality of electrode leads and a bus bar overlapped in plural layers in a parallel connection structure.

Technical Solution

In one aspect of the present disclosure, there is provided a battery module comprising pouch-type battery cells stacked on each other and electrically connected in series and/or in parallel. Toward an electrode lead of one pouch-type battery cell, electrode leads of other pouch-type battery cells are biased to allow ends of the electrode leads to be overlapped, and each of the pouch-type battery cells include an R bending portion at which a boundary region between a terrace of a pouch case and the electrode leads is bent toward a direction in which the electrode leads are biased.

The R bending portion may have a rounded recess shape, and the terrace may be bent to allow a front end thereof is disposed near a deepest region of the rounded recess shape of the R bending portion.

The battery module may comprise a positive electrode lead group in which ends of at least two positive electrode leads are overlapped and linearly extend; and a negative electrode lead group in which ends of at least two negative electrode leads provided in a same number as the positive electrode leads are overlapped and linearly extend in a same direction as the positive electrode lead group. With respect to a first positive electrode lead and a first negative electrode lead that face each other at a shortest distance among the positive electrode lead group and the negative electrode lead group, other positive electrode leads may be biased toward the first positive electrode lead, and other negative electrode leads may be biased toward the first negative electrode lead.

The battery module may comprise a bus bar assembly configured to electrically connect the positive electrode lead group and the negative electrode lead group. In particular, the bus bar assembly may include a fixed bus bar formed in a rod-shaped conductor; a pair of movable bus bars disposed to be spaced apart from each other at both sides of the fixed bus bar with the fixed bus bar interposed therebetween to form a fitting space between the movable bus bars and the fixed bus bar for the positive electrode lead group and the negative electrode lead group to be respectively inserted therein; and an adhering member configured to move the pair of movable bus bars toward the fixed bus bar with the positive electrode lead group and the negative electrode lead group disposed in the fitting space to allow the positive electrode lead group and the negative electrode lead group to be coupled to the fixed bus bar.

The adhering member may be a leaf spring having both ends coupled to the pair of movable bus bars to move the pair of movable bus bars in directions facing each other due to an elastic restoring force thereof.

Each of the pair of movable bus bars may include a contact portion provided in parallel to the fixed bus bar; and gap adjusting portions that extend from both ends of the contact portion and are bent, and the gap adjusting portion may be connected to the adhering member. The pair of movable bus bars may be disposed symmetrically with respect to the fixed bus bar to surround the fixed bus bar.

In another aspect of the present disclosure, there is also provided a battery pack, comprising the battery module described above.

Advantageous Effects

According to an aspect of the present disclosure, an electric contact between the electrode lead and the terrace front end of the pouch case in adjacent pouch-type battery cells among a plurality of pouch-type battery cells connected in parallel may be prevented, and therefore, safety may be improved.

In particular, according to an aspect of the present disclosure, since there is no problem such as an increased cost and a complicated assembly process, the high efficiency is ensured compared to where a separate component or insulating taping is used in order to prevent an electrical short between the electrode lead and the pouch case.

In addition, according to another aspect of the present disclosure, since all of the electrode leads may be welded in a mechanically compressed state, reliability for the electrical connection and the mechanical bonding strength may be improved regardless of the number of electrode leads in a parallel connection structure.

Moreover, since the manual process for bending terminal portions of the electrode leads is eliminated, the automation rate of the battery module production line may be improved.

The effects of the present disclosure are not limited to the above, and effects not mentioned herein may be clearly understood from the present specification and the accompanying drawings by those skilled in the art.

BEST MODE

Figure 1:
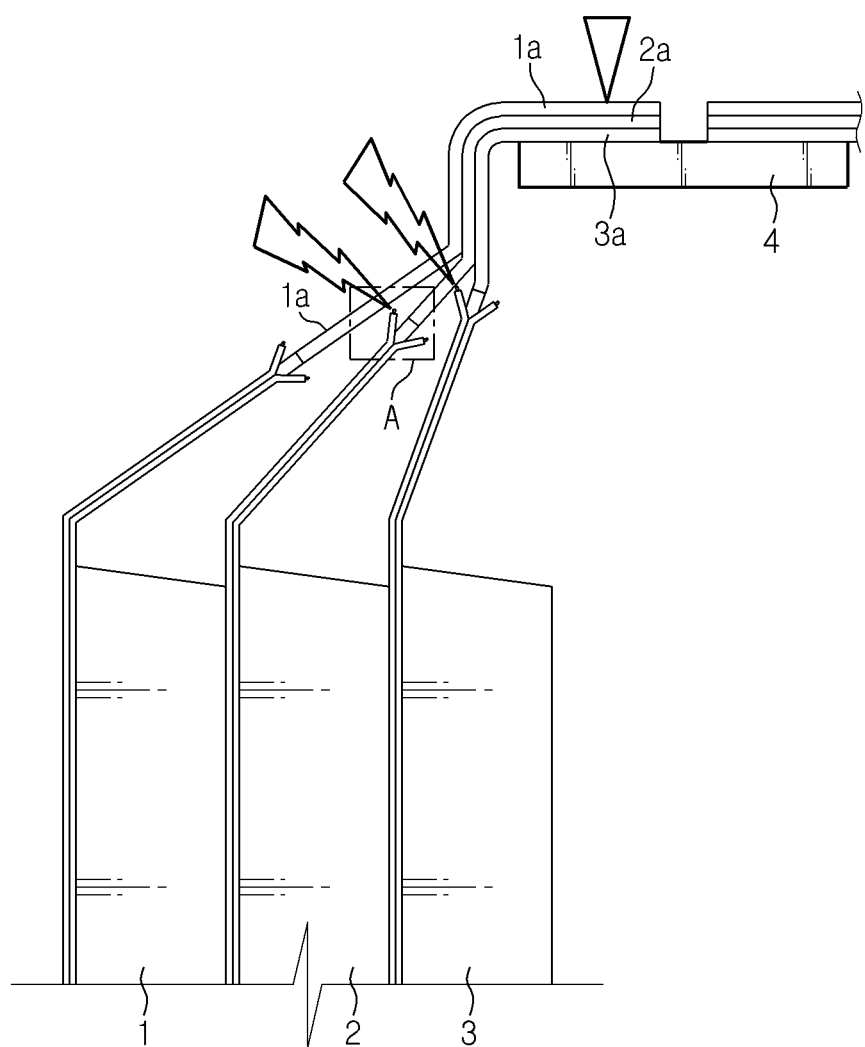
FIG. 1 is a diagram schematically showing that several pouch-type battery cells according to the prior art are connected in parallel.
Figure 2:
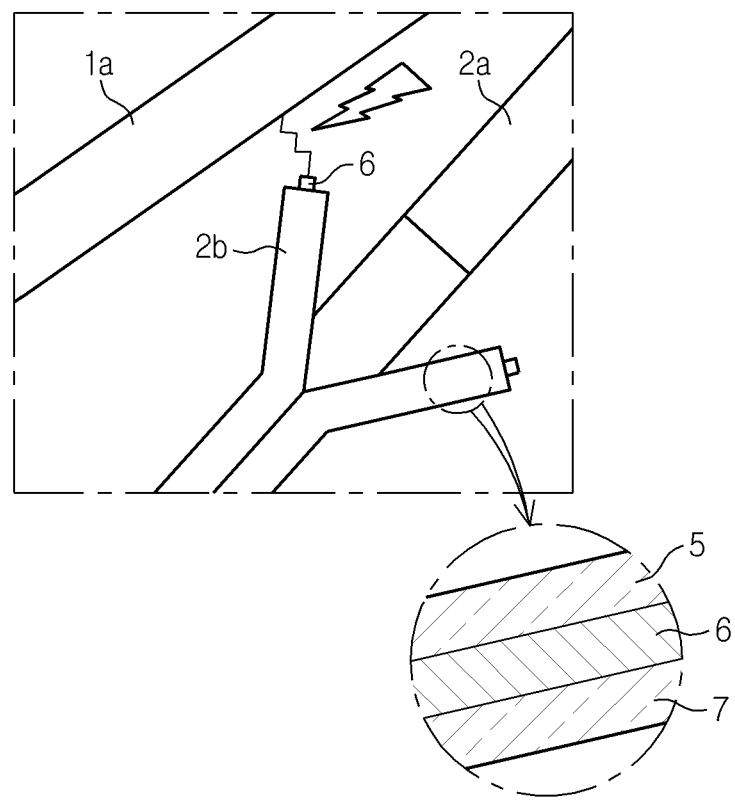
FIG. 2 is an enlarged view showing a portion A of FIG. 1.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

The embodiments disclosed herein are provided for more perfect explanation of the present disclosure, and thus the shape, size and the like of components may be exaggerated, omitted or simplified in the drawings for better understanding. Thus, the size and ratio of components in the drawings do not wholly reflect the actual size and ratio.

A battery module according to the present disclosure includes a cell stack having pouch-type battery cells 10 stacked in one direction and electrically connected in series and/or in parallel, a voltage sensing assembly for electrically connecting the cell stack and sensing a voltage of the cell stack, a module housing for accommodating the cell stack to be protected from exterior elements and providing a mechanical support to the cell stack, and various devices for controlling charge and discharge of the pouch-type battery cells 10 such as a battery management system (BMS), a current sensor, a fuse, and the like. In the following disclosure, any configuration that may blur the gist of the present disclosure will not be explained, and characteristic features of the present disclosure will be described in detail.

Figure 3:
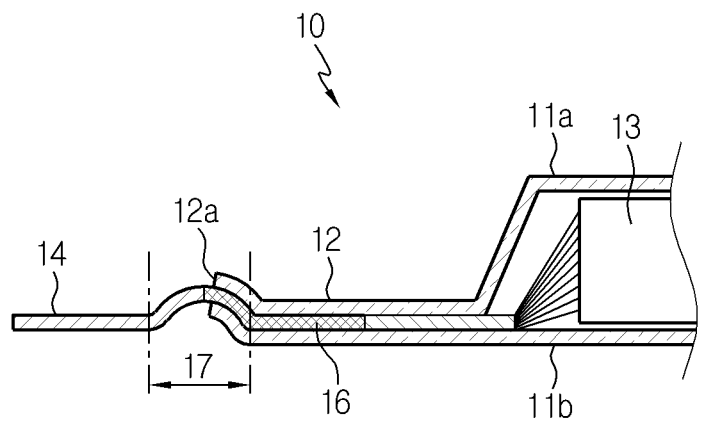
FIG. 3 is a diagram schematically showing a pouch-type battery cell according to an embodiment of the present disclosure.

FIG. 3 is a diagram schematically showing a pouch-type battery cell 10 according to an embodiment of the present disclosure.

First, referring to FIG. 3, a pouch-type battery cell 10 applied to the battery module according to the present disclosure includes an electrode assembly 13, a pouch case, and an electrode lead having one end connected to the electrode assembly 13 and the other end that extends out of the pouch case. For reference, a part of the electrode lead is thermally bonded together with the pouch case. In particular, since the thermal bonding layer of the pouch case is made of a resin layer and the electrode lead is made of a metal, the thermal bonding between the electrode lead and the pouch case may be insufficient. In order to supplement the thermal bonding, an adhesive tape 16 may be used. The electrode lead may be thermally bonded to the pouch case in a state where its periphery is taped with the adhesive tape 16.

Although not shown in detail for the sake of convenience of illustration, the electrode assembly 13 may include a positive electrode plate, a separator, and a negative electrode plate, and may be configured so that the positive electrode plate and the negative electrode plate respectively coated with a positive electrode active material and a negative electrode active material are repeatedly laminated with the separator interposed therebetween. Generally, the negative electrode plate is slightly larger in size than the positive electrode plate and thus is disposed at the top and bottom ends of the electrode assembly 13. The electrode assembly 13 may be accommodated in the pouch case together with an electrolyte in a sealed state.

The pouch case has a multi-layered structure in which a polyolefin resin layer that is a thermal bonding layer serving as a sealing material, a substrate for maintaining mechanical strength, an aluminum (AL) layer that is a metal layer for blocking moisture and oxygen, and a nylon layer that serves as a protective layer are laminated. Casted polypropylene (CPP) is often used as the polyolefin resin layer that serves as a thermal bonding layer.

The pouch case is provided so that its edges are sealed after the electrode assembly 13 is accommodated therein and an electrolyte is injected therein. For example, the pouch case includes a first pouch sheet 11a and a second pouch sheet 11b. In particular, the first pouch sheet 11a may be formed to accommodate the electrode assembly 13 in a central region thereof, and the second pouch sheet 11b may be provided to face the first pouch sheet 11a to allow their edges to be thermally bonded to each other. Hereinafter, the thermally bonded edge region of the pouch case is defined as a terrace 12.

In particular, referring to FIGS. 3-6 together, each of the pouch-type battery cells 10 of the battery module according to the present disclosure may further include an R bending portion 17. The R bending portion 17 is a portion prepared by bending a boundary region between the terrace 12 of the pouch exterior and the electrode lead. When multiple pouch-type battery cells 10 are connected in parallel, the R bending portion 17 prevents the electrode lead and a terrace front end 12a of the pouch exterior from interfering with each other or from contacting each other.

More specifically, referring to the R bending portion 17, the terrace front end 12a of the pouch case is disposed at a position where the R bending portion 17 is sharply bent compared to other portions to deviate from a linear line along which the electrode lead extends from the terrace 12 of the pouch exterior.

In this embodiment, the R bending portion 17 may have a rounded or arc recess shape in a region before and after the boundary region between the terrace 12 of the pouch exterior and the electrode lead. In particular, the terrace front end 12a of the pouch exterior is preferably disposed at a deepest region of the recess shape of the R bending portion 17.

Figure 4:
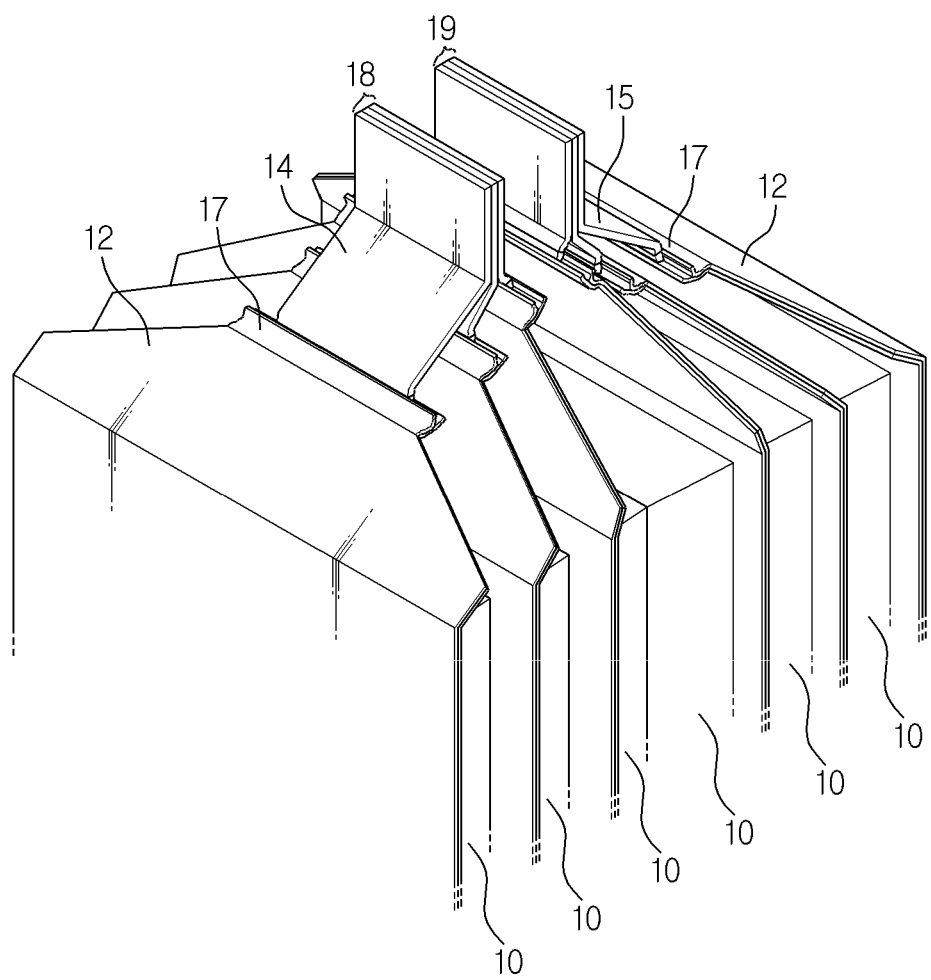
FIGS. 4 and 5 are a perspective view and a cross-sectioned view, respectively, schematically showing that multiple pouch-type battery cells according to an embodiment of the present disclosure are connected in parallel.
Figure 5:
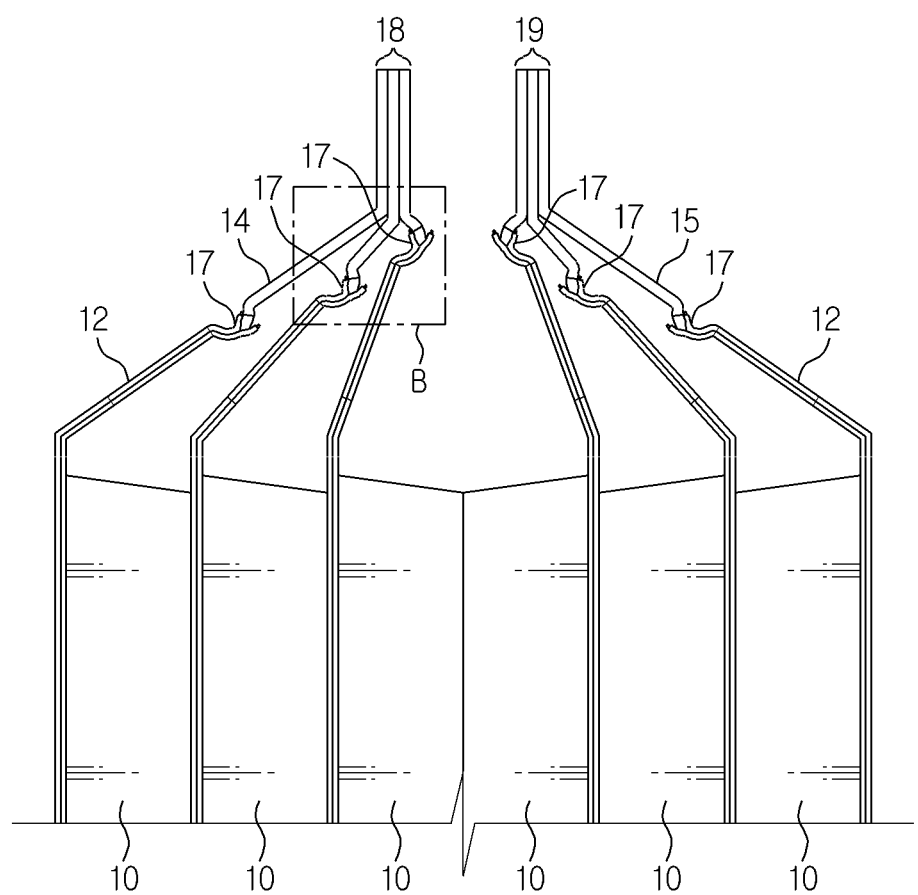

In addition, as shown in FIGS. 4 and 5, the R bending portion 17 is formed in a same direction as the direction in which, based on an electrode lead of one pouch-type battery cell 10, electrode leads of other pouch-type battery cells 10 are biased when several pouch-type battery cells 10 are connected in parallel.

For example, in this embodiment, it is assumed that among six pouch-type battery cells 10 in total, three pouch-type battery cells 10 are connected in parallel, respectively. In this case, positive electrode leads 14 of the first and second pouch-type battery cells 10, counted from the left side of FIG. 5, may be biased to the right side to overlap with a positive electrode lead 14 of the third pouch-type battery cell 10 as a reference. Accordingly, the R bending portions 17 of the three left pouch-type battery cells 10 are oriented to the right, which corresponds to the direction in which the positive electrode leads 14 are biased. On the contrary, negative electrode leads 15 of the fifth and sixth pouch-type battery cells 10, counted from the left side of FIG. 5, may be biased to the left side to overlap with a negative electrode lead 15 of the fourth pouch-type battery cell 10 as a reference. Accordingly, the R bending portions 17 of the three right pouch-type battery cells 10 are oriented to the left.

Figure 6:
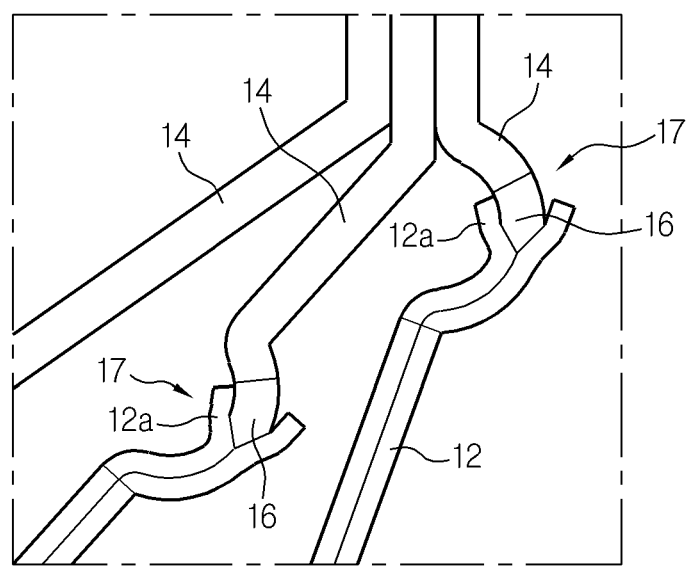
FIG. 6 is an enlarged view showing a portion B of FIG. 5.

Due to the R bending portions 17 of the pouch-type battery cells 10, when the pouch-type battery cells 10 are connected in parallel, as shown in FIG. 6, even though an electrode lead of any one pouch-type battery cell 10 is biased at any angle, the electrode lead may be prevented from interfering with or contacting the terrace front end 12a of another pouch-type battery cell 10. Thus, when the pouch-type battery cells 10 are connected in parallel, due to the R bending portion 17 of the present disclosure, unlike the prior art where a separate component or an insulating tape is provided, the possibility of electric contact between the electrode lead and the metal layer of the pouch exterior may be efficiently eliminated.

Meanwhile, the pouch-type battery cells 10 of the battery module according to the present disclosure have a positive electrode lead group 18 in which one ends of at least two positive electrode leads 14 extend linearly, and a negative electrode lead group 19 in which negative electrode leads provided in the same number as the positive electrode leads 14 extend linearly in the same direction as the positive electrode lead group 18.

With respect to a first positive electrode lead 14 and a first negative electrode lead 15 that face each other at a shortest distance among the positive electrode lead group 18 and the negative electrode lead group 19, other positive electrode leads 14 may be biased toward the first positive electrode lead 14, and other negative electrode leads 15 may be biased toward the first negative electrode lead 15. Although only one side of the pouch-type battery cells 10 connected in parallel is illustrated in the figures for an example, the opposite side of the pouch-type battery cells 10 may have the same structure, even though its polarity is different, and thus it will not be described in detail again.

For example, in the pouch-type battery cells 10 depicted in FIGS. 4 and 5, the first positive electrode lead 14 may correspond to the positive electrode lead 14 of the third pouch-type battery cell 10, counted from the left side on the figures, and the first negative electrode lead 15 may correspond to the negative electrode lead 15 of the fourth pouch-type battery cell 10. In this configuration, the gap between the positive electrode lead group 18 and the negative electrode lead group 19 may be minimized, which makes it easier to connect the positive electrode lead group 18 and the negative electrode lead group 19 to a bus bar later.

The positive electrode lead group 18 and the negative electrode lead group 19 according to the present disclosure may be coupled to the bus bar assembly 20, to be explained later, in a linearly extending form.

Figure 7:
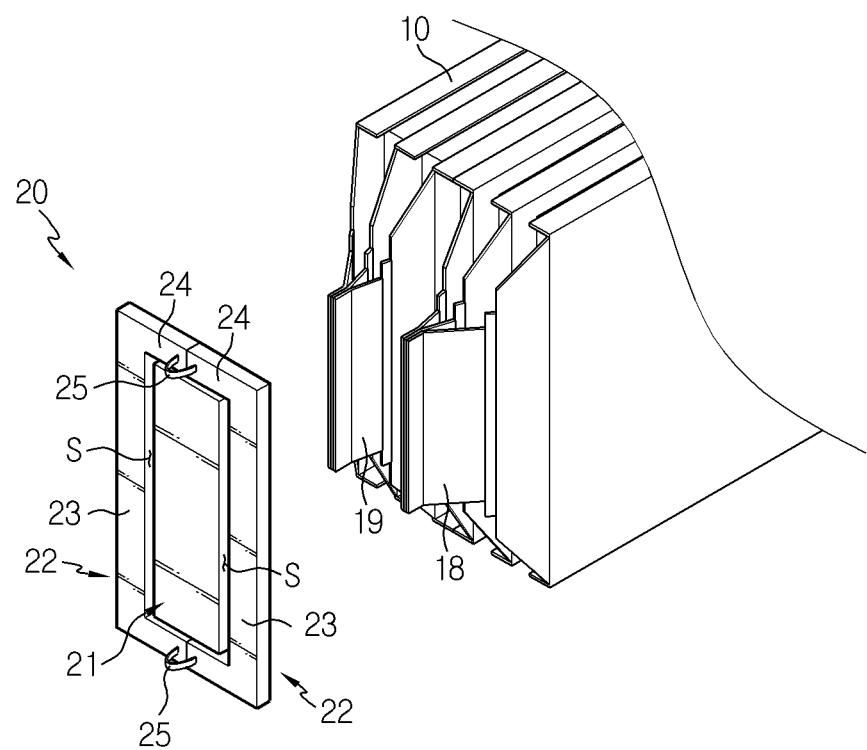
FIGS. 7 to 9 are diagrams for illustrating each step of connecting electrode leads of the pouch-type battery cells according to an embodiment of the present disclosure to a bus bar assembly.
Figure 8:
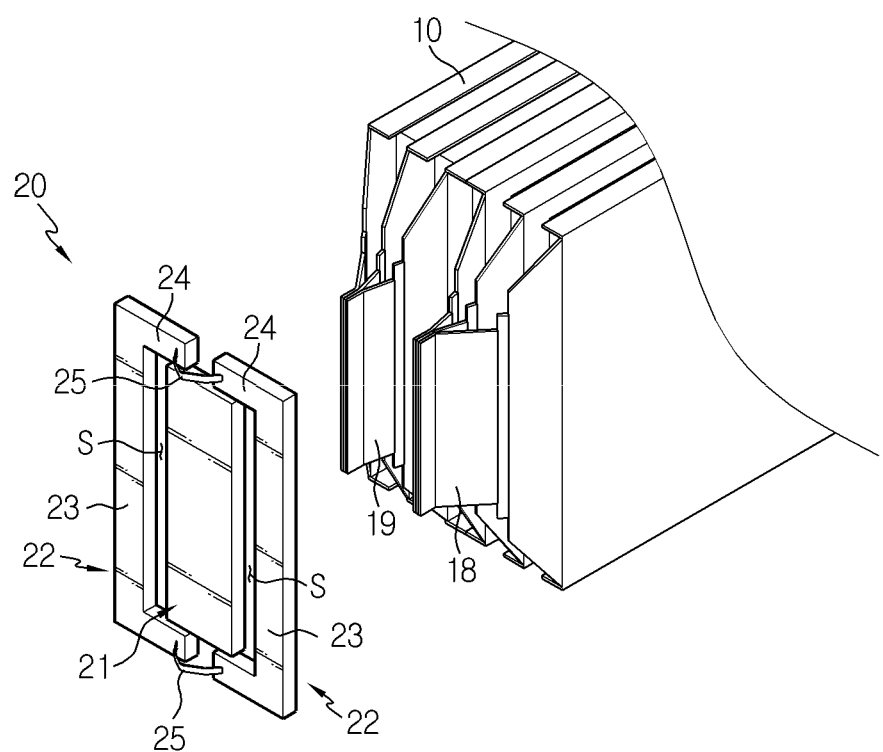
Figure 9:
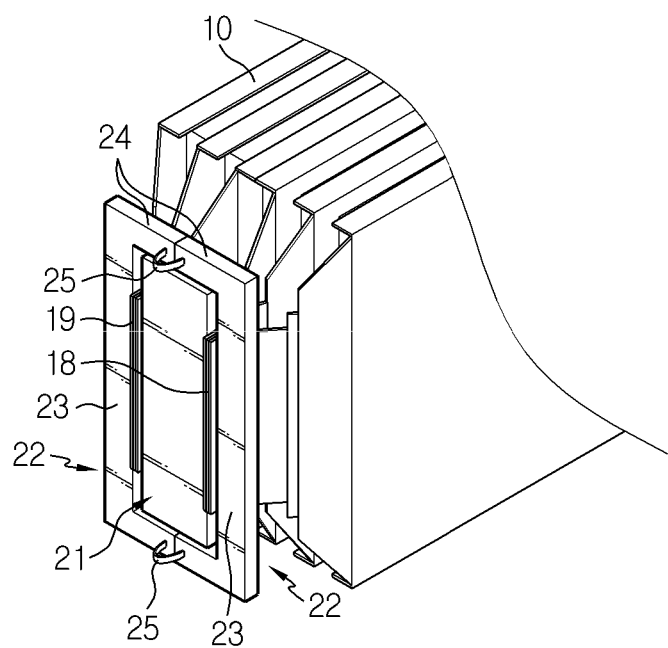

FIGS. 7 to 9 are diagrams for illustrating each step of connecting the electrode leads of the pouch-type battery cells 10 according to an embodiment of the present disclosure to the bus bar assembly 20.

Referring to FIGS. 7 to 9, the battery module of the present disclosure may further include a bus bar assembly 20 for electrically connecting the positive electrode lead group 18 and the negative electrode lead group 19.

The bus bar assembly 20 may include a fixed bus bar 21, a pair of movable bus bars 22, and a contact portion 23 for allowing the pair of movable bus bars 22 to be movable relative to the fixed bus bar 21.

As will be described in more detail below, according to the present disclosure, the positive electrode lead group 18 and the negative electrode lead group 19 may be inserted into a fitting space S of the bus bar assembly 20, and subsequently, clamped and welded thereto. Thus, unlike the prior art, the bending process of the electrode lead is unnecessary, and therefore, the automation ratio of the production line may be increased. In addition, according to the present disclosure, the electrode lead groups may be welded under mechanical compression. Thus, even when two or more electrode leads are joined in parallel, it is possible to maintain the reliability of electrical connection and the mechanical bonding strength.

Hereinafter, the bus bar assembly 20 according to the present disclosure will be described in more detail.

The fixed bus bar 21 may be formed as a rod-shaped and made of an electrically conductive material such as copper, silver, and tin-plated copper. Thus, when the positive electrode lead group 18 and the negative electrode lead group 19 contact the fixed bus bar 21, the current of the battery module may stably flow.

The movable bus bar 22 may also be made of a metal with electrical conductivity such as copper, silver, tinned copper, or copper, similar to the fixed bus bar 21. However, the movable bus bar 22 has a main function of pressing the positive electrode lead group 18 and the negative electrode lead group 19 to be adhered to the fixed bus bar 21 and be clamped. Thus, it may be unnecessary to make the movable bus bar 22 with a metal material, and the movable bus bar 22 may be made of a non-metallic material.

The movable bus bar 22 is provided in a pair to be movable relative to the fixed bus bar 21 interposed therebetween. In addition, a fitting space S is provided between the movable bus bar 22 and the fixed bus bar 21 to allow the positive electrode lead group 18 or the negative electrode lead group 19 to pass therethrough. For example, as shown in FIGS. 7 and 8, the negative electrode lead group 19 may be inserted in the fitting space S between the left movable bus bar 22 and the fixed bus bar 21, and the positive electrode lead group 18 may be inserted in the fitting space S between the right movable bus bar 22 and the fixed bus bar 21.

Each of the pair of movable bus bars 22 according to this embodiment includes an contact portion 23 and a gap adjusting portion 24 that form a substantially square bracket shape and may be symmetrically disposed about the fixed bus bar 21 to surround the fixed bus bar. The contact portion 23 may be defined as a portion disposed in parallel to the fixed bus bar 21, and the gap adjusting portion 24 may be defined as a portion bent and extending from both ends of the contact portion 23 toward the fixed bus bar 21.

The gap adjusting portion 24 of the left movable bus bar 22 and the gap adjusting portion 24 of the right movable bus bar 22 are configured to contact each other. The width of the fitting space S may be variously designed depending on the length of the gap adjusting portions 24 of the movable bus bars 22 in contact.

An adhering member 25 may move the pair of movable bus bars 22 toward the fixed bus bar 21. In this embodiment, a leaf spring is applied as the adhering member 25. Both ends of the leaf spring are coupled to left and right movable bus bar 22 in a state where the leaf spring is closed. Thus, when the left and right movable bus bars 22 are released after being pulled outward by applying an external force, the left and right movable bus bars 22 are moved toward the fixed bus bar 21 into an original state due to the elastic restoring force of the leaf spring.

Hereinafter, a process of bonding the positive electrode lead group 18 and the negative electrode lead group 19 connected in parallel to the bus bar assembly 20 will be briefly described with reference to FIGS. 7 to 9.

First, the positive electrode lead group 18 and the negative electrode lead group 19 are formed by overlapping one ends of the positive electrode leads 14 and one ends of the negative electrode leads 15, respectively, with respect to the first positive electrode lead 14 and the first negative electrode lead 15 adjacent to each other.

Subsequently, the left and right movable bus bars 22 of the bus bar assembly 20 are pulled outward to secure the sufficient fitting space S, and in this state, the positive electrode lead group 18 and the negative electrode lead group 19 are inserted into the corresponding fitting space S, respectively.

Thereafter, the left and right movable bus bars 22 of the bus bar assembly 20 are released to allow the positive electrode lead group 18 and the negative electrode lead group 19 to abut the fixed bus bar 21. The positive electrode lead group 18 and the negative electrode lead group 19 may be clamped by the bus bar assembly 20 and be coupled to the fixed bus bar 21 in a linearly extending state. Further, a welding process may be used to more securely bond the positive electrode lead group 18 and the negative electrode lead group 19 to the bus bar assembly 20.

According to the bus bar assembly 20 of the present disclosure, the process of bending the electrode lead of the prior art (see FIG. 1) is unnecessary during the electrode lead welding process. Thus, the manual process for bending the electrode leads may be eliminated to improve the automation ratio of the battery module production line. In addition, since all of the electrode leads may be welded in a mechanically compressed state, the electrical connectivity and the reliability of mechanical bonding strength may be improved regardless of the number of the electrode leads in the parallel connection structure.

A battery pack according to the present disclosure may include at least one battery modules of the present disclosure. In addition to the battery module, the battery pack according to the present disclosure may further include a pack case for accommodating the battery module, various devices for controlling charge and discharge of each battery module, and the like.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left, and right directions are used in the specification, it is obvious to those skilled in the art that these merely represent relative positions for convenience in explanation and may vary based on a location of an observer or an object to be observed.

What is claimed is:

1. A battery module, comprising:
a plurality of pouch-type battery cells stacked on each other along a stacking dimension and electrically connected in series and/or in parallel, the plurality of pouch-type battery cells including at least a first pouch-type battery cell and a second pouch-type battery cell, each of the plurality of pouch-type battery cells including a pouch case having an electrode lead extending outwardly therefrom though an edge region of the pouch case and extending along a respective extension axis, each pouch case including a first pouch sheet and a second pouch sheet, the edge region of each pouch case defined by a portion of the first pouch sheet and a portion of the second pouch sheet extending parallel to one another and bonded to each other before terminating at a terminus of the edge region beyond which the electrode lead extends,
wherein the electrode lead of the second pouch-type battery cell is angled in a first direction along the stacking dimension so as to converge towards the electrode lead of the first pouch-type battery cell, wherein the electrode lead of each of the pouch-type battery cells has a bent portion in which the electrode lead deviates from the respective extension axis so as to have a convex shape facing in the first direction, and wherein the terminus of the edge region of each pouch case is located along the respective electrode lead at the bent portion.

2. The battery module according to claim 1, wherein the bent portion of each electrode lead has a rounded shape, and wherein the terminus of the edge region of each pouch case is disposed near a deepest region of the bent portion having the largest deviation from the respective extension axis.

3. The battery module according to claim 1, comprising: a positive electrode lead group in which ends of at least two positive electrode leads are overlapped and linearly extend; and a negative electrode lead group in which ends of at least two negative electrode leads provided in a same number as the positive electrode leads are overlapped and linearly extend in a same direction as the positive electrode lead group, wherein a first positive electrode lead is the closest of the positive electrode leads to the negative electrode leads, and a first negative electrode lead is the closest of the negative electrode leads to the positive electrode leads, and wherein the positive electrode leads other than the first positive electrode lead are biased toward the first positive electrode lead, and the negative electrode leads other than the first negative electrode lead are biased toward the first negative electrode lead.

4. The battery module according to claim 3, further comprising: a bus bar assembly configured to electrically connect the positive electrode lead group and the negative electrode lead group, wherein the bus bar assembly includes: a fixed bus bar formed in a rod-shaped conductor; a pair of movable bus bars disposed to be spaced apart from each other at both sides of the fixed bus bar with the fixed bus bar interposed therebetween to form a fitting space between the movable bus bars and the fixed bus bar to allow the positive electrode lead group and the negative electrode lead group to be respectively inserted therein; and an adhering member configured to move the pair of movable bus bars toward the fixed bus bar with the positive electrode lead group and the negative electrode lead group disposed in the fitting space to allow the positive electrode lead group and the negative electrode lead group to be coupled to the fixed bus bar.

5. The battery module according to claim 4, wherein the adhering member is a leaf spring having both ends coupled to the pair of movable bus bars to move the pair of movable bus bars in directions facing each other due to an elastic restoring force thereof.

6. The battery module according to claim 4, wherein each of the pair of movable bus bars includes: a contact portion provided in parallel to the fixed bus bar; and gap adjusting portions that extend from both ends of the contact portion and are bent, the gap adjusting portions connected to the adhering member, wherein the pair of movable bus bars are disposed symmetrically with respect to the fixed bus bar to surround the fixed bus bar.

7. A battery pack, comprising the battery module according to claim 1.

\* \* \* \* \*